United States Patent
Lahetkangas et al.

(10) Patent No.: US 9,642,118 B2
(45) Date of Patent: May 2, 2017

(54) CONTROLLING A MODULATION AND CODING SCHEME FOR A TRANSMISSION BETWEEN A BASE STATION AND A USER EQUIPMENT

(75) Inventors: Eeva Lahetkangas, Oulu (FI); Bernhard Raaf, Neuried (DE); Kari Pekka Pajukoski, Oulu (FI); Esa Tapani Tiirola, Kempele (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 14/379,314

(22) PCT Filed: Feb. 20, 2012

(86) PCT No.: PCT/EP2012/052828
§ 371 (c)(1),
(2), (4) Date: Oct. 20, 2014

(87) PCT Pub. No.: WO2013/123961
PCT Pub. Date: Aug. 29, 2013

(65) Prior Publication Data
US 2015/0036590 A1    Feb. 5, 2015

(51) Int. Cl.
*H04L 1/00* (2006.01)
*H04W 72/02* (2009.01)
*H04L 27/04* (2006.01)

(52) U.S. Cl.
CPC .......... *H04W 72/02* (2013.01); *H04L 1/0003* (2013.01); *H04L 1/0009* (2013.01);
(Continued)

(58) Field of Classification Search
None
See application file for complete search history.

(56) References Cited

U.S. PATENT DOCUMENTS

2007/0117570 A1    5/2007    Noh et al. .............. 455/452.2
2007/0147535 A1    6/2007    Niu et al.
(Continued)

FOREIGN PATENT DOCUMENTS

CN    101790228 A     7/2010
EP    1 845 742 A1   10/2007
(Continued)

OTHER PUBLICATIONS

Motorola: "64QAM for HSDPA-Modulation Format Indication"; R1-070568; 3GPP TSG RAN1#47bis, Sorrento, Italy, Jan. 15-19, 2007; pp. 1-6; 3rd Generation Partnership Project (3GPP); Mobile Competence Centre; 650, Route des Lucioles; F-06921 Sophia-Antipolis Cedex; France, (6 pages).
(Continued)

*Primary Examiner* — Hassan Phillips
*Assistant Examiner* — Ayanah George
(74) *Attorney, Agent, or Firm* — Harrington & Smith

(57) ABSTRACT

It is described a method for controlling a modulation and coding scheme for a transmission between a base station and a user equipment, wherein the modulation and coding scheme is selectable based on a first modulation and coding scheme table including entries corresponding to a plurality of modulation and coding schemes with a first maximum modulation order or based on a second modulation and coding scheme table including entries corresponding to a plurality of modulation and coding schemes with a second maximum modulation order. The method comprises selecting, by the base station, the first modulation and coding scheme table or the second modulation and coding scheme table, and controlling, by the base station, the modulation and coding scheme for the transmission between the base station and the user equipment based on the selected modulation and coding scheme table.

16 Claims, 2 Drawing Sheets

(52) U.S. Cl.
CPC .......... *H04L 1/0015* (2013.01); *H04L 1/0016* (2013.01); *H04L 1/0025* (2013.01); *H04L 27/04* (2013.01); *H04L 1/0026* (2013.01)

(56) References Cited

U.S. PATENT DOCUMENTS

| | | | |
|---|---|---|---|
| 2007/0160122 A1 | 7/2007 | Yoshida | ................ 375/219 |
| 2007/0291913 A1* | 12/2007 | Trainin | ............. H04L 12/66 379/93.08 |
| 2009/0010211 A1 | 1/2009 | Sumasu et al. | |
| 2010/0238845 A1* | 9/2010 | Love | ............ H04B 7/15528 370/280 |
| 2011/0235604 A1 | 9/2011 | Inoue et al. | |

FOREIGN PATENT DOCUMENTS

| | | | | |
|---|---|---|---|---|
| EP | 1845742 A1 * | 10/2007 | ........... | H04L 1/0003 |
| EP | 1 903 692 A1 | 3/2008 | | |
| EP | 1903692 A1 * | 3/2008 | ........... | H04L 1/0016 |
| JP | 2006217173 A | 8/2006 | | |
| JP | 2008193520 A | 8/2008 | | |
| JP | 2008211344 A | 9/2008 | | |
| JP | 2010034834 A | 2/2010 | | |
| JP | 4823225 B2 | 11/2011 | | |
| WO | WO 2010/061825 A1 | 6/2010 | | |

OTHER PUBLICATIONS

3GPP TSG-RAN WG1 Meeting #47bis, Sorrento, Italy, Jan. 15-19, 2007, R1-070570, "Way forward for HS-SCCH part 1 structure for MIMO and 64QAM", Philips, Ericsson, Motorola, Nokia, Qualcomm, 3 pgs.

3GPP TSG-RAN WG1 Meeting #47bis, Sorrento, Italy, Jan. 15-19, 2007, R1-070635, "DRAFT Introduction of 64QAM for HSDPA", Ericsson, [Qualcomm Europe], [Motorola], [Philips], 11 pgs.

3GPP TS 36.213, V10.3.0 (Sep. 2011), "$3^{rd}$ Generation Partnership Project; Technical Specification Group Access Network, Evolved Universal Terrestrial Radio Access (E-UTRA); Physical layer procedures (Release 10)", 122 pgs.

3GPP TS 36.213 V10.4.0 (Dec. 2011); "3rd Generation Partnership Project; Technical Specification Group Radio Access Network; Evolved Universal Terrestrial Radio Access (E-UTRA); Physical layer procedures (Release 10)"; 125 pages (pp. 32-34, 63-65).

3GPP TS 36.213 V12.3.0 (Sep. 2014); "3rd Generation Partnership Project; Technical Specification Group Radio Access Network; Evolved Universal Terrestrial Radio Access (E-UTRA); Physical layer procedures (Release 12)"; 212 pages (pp. 46-48, 94).

Chin-Hung Chen, et al.; IEEE 802.11-10/1361r3; "IEEE P802.11 Wireless LANs; Proposed TGac Draft Amendment"; Jan. 2011; 154 pages (pp. 139-148).

* cited by examiner

- - - - 4x4 MIMO, adaptive MCS up to 256 QAM — 301
―――― 4x4 MIMO, adaptive MCS up to 64 QAM — 302
- - - - 2x2 MIMO, adaptive MCS up to 256 QAM — 303
―――― 2x2 MIMO, adaptive MCS up to 64 QAM — 304

CONTROLLING A MODULATION AND CODING SCHEME FOR A TRANSMISSION BETWEEN A BASE STATION AND A USER EQUIPMENT

FIELD OF INVENTION

The present invention relates to the field of cellular networks, especially to an evolution of LTE networks, and in particular to networks comprising LTE networks and evolved LTE networks.

ART BACKGROUND

There have been further developments for LTE, for instance relating to a Beyond 4G (B4G) radio system which is assumed to be commercially available in 2020. It might however also be introduced in an evolution of LTE at any date within any new release.

LTE provides a peak bit rate of 30 bps/Hz by using 64QAM modulation and 8×8 MIMO transmission. As a result, B4G may require a higher order modulation, for instance 256QAM, than 64QAM in order to meet future requirements. Higher order modulations may be relevant for example in relay backhaul due to better channel quality and better radio frequency (RF) properties which are more easily feasible for relays than for user equipments (UEs) or for isolated indoor cells where the UEs are close by and therefore both having a good link to the access point and no or very little interference from other access points due to attenuation by the walls.

The modulation order determination of LTE Release 10 is described in TS 36.213 V10.3, chapter 7.1.7 and CQI definition in chapter 7.2.3. In LTE (and LTE-Advanced), theoretical spectral efficiency is restricted by 64QAM modulation. An improved spectral efficiency may be gained with extension to 256QAM.

In the LTE standard, there is defined a MCS (modulation and coding scheme) index and modulation table and CQI (channel quality indicator) table. These are used for determining and selecting appropriate modulation and coding schemes. The current tables support up to 64QAM. The problem is how to introduce a 256QAM extension or any other higher order modulation extension for LTE while maintaining backward compatibility and avoiding too much complexity.

There may be a need for an improved and flexible system and method being adapted to allow an extension to a higher order modulation while remaining backward compatible for LTE. In particular it is desirable to maintain signaling formats in particular utilize the same number of bits as otherwise different encoding schemes need to be used and potentially so called blind decoding has to be applied.

SUMMARY OF THE INVENTION

This need may be met by the subject matter according to the independent claims. Advantageous embodiments of the present invention are described by the dependent claims.

According to a first aspect of the invention there is provided a method for controlling a modulation and coding scheme for a transmission between a base station and a user equipment, wherein the modulation and coding scheme is selectable based on a first modulation and coding scheme table comprising entries corresponding to a plurality of modulation and coding schemes with a first maximum modulation order or based on a second modulation and coding scheme table comprising entries corresponding to a plurality of modulation and coding schemes with a second maximum modulation order. The method comprises selecting, by the base station, the first modulation and coding scheme table or the second modulation and coding scheme table, and controlling, by the base station, the modulation and coding scheme for the transmission between the base station and the user equipment based on the selected modulation and coding scheme table.

This aspect of the invention is based on the idea to extend the modulation and coding scheme table to a higher order modulation while remaining backward compatible. The first table may support for instance up to 64QAM (quadrature amplitude modulation) and the second table may support for instance up to 256QAM, or any other higher order modulation extension. It should be noted that although 256QAM is explicitly mentioned herein, any other higher modulation order than that used for the first table may be used, for instance also 128QAM or in general a higher modulation and coding scheme (MCS) which may be characterized by either modulation order or coding scheme of both.

The idea of this method is to introduce a higher order modulation while still supporting a modulation and coding scheme (MCS) table being introduced for a lower modulation order.

The term "modulation order" in this context may be determined by the number of the different symbols that can be transmitted using it. In general MCS also considers different code rates and thus indicates the average number of payload bits that can be transmitted per symbol. The first maximum modulation order and the second maximum modulation order may be the same or may be different.

The term "modulation and coding scheme table" may refer to the MCS table being defined in LTE and being used for determining and selecting appropriate modulation and coding schemes. The second table may be an extended MCS table being based on the MCS as defined in LTE but comprising entries corresponding to a higher order modulation. For instance, the backward compatibility may be ensured by having a first table exactly as it is currently defined in the LTE standard.

The first and the second table may be different in some respects. For instance, one table may be biased more towards low MCS and the second towards high MCS values. For example, one table may have more MCS values below a certain threshold MCS. Also the density of MCS values at lower MCS may be higher in one table or the center of gravity or average of the MCS values may be lower in one table. In one embodiment, one table is a mirror image of the other, for instance being mirrored at the middle MCS.

The term "base station" in this context may denote any kind of physical entity being able to communicate with a user equipment or any other network device by selecting a modulation and coding scheme from such a MCS table. A base station in this context may be any kind of network device providing the required functionality for the method, it may also be a transceiver node in communication with a centralized entity. The base station may be for example a NodeB or eNB.

The base station may either inform the UE explicitly about a change of the used MCS table or may inform and select the MCS table implicitly as part of the capability enquiry procedure.

According to an embodiment of the invention, the second maximum modulation order is higher than the first maximum modulation order. In particular, the first maximum modulation order corresponds to 64QAM and the second maximum modulation order corresponds to 256QAM.

It should be noted that also other modulation orders may be used, for instance 128QAM.

Furthermore, a few high MCSs may be included in the first table to be able to quickly react in case the channel gets suddenly better.

According to a further embodiment of the invention, the maximum modulation order may correspond to the highest modulation and coding scheme (MCS). Further, the highest modulation and coding scheme may be the same for both tables.

According to a further embodiment of the invention, the method further comprises determining, by the base station, actual channel conditions of a radio transmission channel being used for the transmission between the base station and the user equipment, determining, by the base station, a maximum supported modulation order based on the determined actual channel conditions, and selecting, by the base station, the first modulation and coding scheme table or the second modulation and coding scheme table based on a comparison of the maximum supported modulation order with the first maximum modulation order and the second maximum modulation order.

If the actual channel conditions do not support the higher order modulation or if the user equipment (UE) is not able to support the higher order modulation, the base station may perform the modulation and coding for the transmission based on the first table. If the actual channel conditions are good enough for the higher order modulation and if the UE supports the higher order modulation, the base station may perform the modulation and coding based on the second table supporting a higher order modulation, for instance up to 256QAM.

According to a further embodiment of the invention, the method further comprises transmitting information to the user equipment being indicative for the selected modulation and coding scheme table.

The base station may provide a signal to the UE comprising information about the selected and used MCS table. The UE may then perform, based on this information, further actions, like CQI reports.

According to a further embodiment of the invention, transmitting information to the user equipment is based on radio resource control signalling.

By using a common signalling, the UE may be easily informed about the selected MCS table. This information may also be included in any information signal comprising information for the UE in view of any other resource control.

According to a further embodiment of the invention, transmitting information to the user equipment is based on implicit signalling.

This may refer to the case, wherein the UE may receive information from the base station and may determine based on this information the selected MCS table. This may be the case for instance as part of the capability enquiry procedure which also makes the capability available to the eNB. During this kind of set up procedure, where the eNB determines capabilities of the UE, the tables may be switched and the UE may be informed implicitly without specific signalling.

According to a further embodiment of the invention, the method further comprises receiving confirmation information from the user equipment being indicative for a performed change of the selected modulation and coding scheme table.

The base station may carry out the change from one table to the selected MCS table after receiving the confirmation signal from the UE. The confirmation signal may thus be indicative for a final change of the MCS tables to be carried out by the base station.

According to a further embodiment of the invention, the first modulation and coding scheme table and the second modulation and coding scheme table each comprise a common subset of equal entries being arranged at same positions within the first modulation and coding scheme table and the second modulation and coding scheme table. In particular, the method further comprises after transmitting the information to the user equipment being indicative for the selected modulation and coding scheme table and before receiving the confirmation information from the user equipment, controlling the modulation and coding scheme for the transmission between the base station and the user equipment based on the selected modulation and coding scheme table based on the common subset of entries.

By using common entries in both MCS tables, the base station may use the common entries as long as there is no confirmation signal from the UE. This may provide the advantage that there is no misunderstanding and wrong modulation and coding as both parts (base station and UE) are using the same modulation and coding scheme (although they may possibly use different tables).

According to a further embodiment of the invention, controlling an initial transmission between the base station and the user equipment is based on the first modulation and coding scheme table.

The base station and the UE may use the MCS table having the lower maximum modulation order at the start of each communication. This may provide the advantage that each communication starts with the same table and afterwards the base station may decide whether to change the MCS table or not. The change may then be performed based on the actual channel conditions if the UE can support the MCS table supporting the higher order modulation.

According to a further embodiment of the invention, the bits of carrying a modulation and coding scheme index are the same for the first modulation and coding scheme table and for the second modulation and coding scheme table.

Thus, it may be ensured that there is a backward compatibility without having to amend the MCS tables in their existing form nor the coding and transmission mechanisms that are employed to convey the selection out of that table. In a more specific embodiment, the tables may have the same size. In particular, parts of the first MCS table and the second MCS table are equal, providing common entries as explained above. Entries of the first MCS table relating to very low modulation orders may be exchanged (redefined) for the second MCS table and may comprise the higher order modulations.

According to a further embodiment of the invention, the actual channel conditions are determined based on a channel quality indicator being selectable based on a first channel quality indicator table supporting the first maximum modulation order or based on a second channel quality indicator table supporting the second maximum modulation order, the method comprising receiving, by the base station, a channel quality indicator from the user equipment, and determining, by the base station, the actual channel conditions of the radio transmission channel being used for the transmission between the base station and the user equipment based on the received channel quality indicator.

Like the MCS tables, also the CQI tables may be selected based on the selection of the MCS tables. If there is a switch or change from the first MCS table to the second MCS table, there may also be change from the first CQI table to the second CQI table. The UE may thus determine the CQI based on a table which corresponds to the selected MCS table.

According to a further embodiment of the invention, the method further comprises selecting, by the base station, the first channel quality indicator table or the second channel quality indicator table based on the selected modulation and coding scheme table, and transmitting information to the user equipment being indicative for the selected channel quality indicator table.

The information of the selected CQI table may be provided to the UE from the base station. The information may also be provided implicitly by informing the user equipment of the selected MCS table.

According to a further embodiment of the invention, the first channel quality indicator table and the second channel quality indicator table each comprise a common subset of equal entries being arranged at same positions within the first channel quality indicator table and the second channel quality indicator table.

Like the MCS tables, also the CQI tables may comprise a common subset. Thus, it may be ensured that, during switching, there are no misunderstandings between the UE and the base station.

According to a second aspect of the invention, there is provided a base station for controlling a modulation and coding scheme for a transmission between the base station and a user equipment, wherein the modulation and coding scheme is selectable based on a first modulation and coding scheme table comprising entries corresponding to a plurality of modulation and coding schemes with a first maximum modulation order or based on a second modulation and coding scheme table comprising entries corresponding to a plurality of modulation and coding schemes with a second maximum modulation order. The base station comprises a selection unit being adapted to select the first modulation and coding scheme table or the second modulation and coding scheme table, and a control unit being adapted to control the modulation and coding scheme for the transmission between the base station and the user equipment based on the selected modulation and coding scheme table.

The base station may be any type of access point or point of attachment, which is capable of providing a wireless access to a cellular network system. Thereby, the wireless access may be provided for a user equipment or for any other network element, which is capable of communicating in a wireless manner. The base station may be a NodeB, eNB, home NodeB or HeNB, or any other kind of access point or also a multihop node or relay. The base station may in particular be used for a B4G, LTE or 3GPP cell and communication.

The base station may comprise a receiving unit, for example a receiver as known by a skilled person. The base station may also comprise a transmitting or sending unit, for example a transmitter. The receiver and the transmitter may be implemented as one single unit, for example as a transceiver. The transceiver or the receiving unit and the sending unit may be adapted to communicate with the user equipment via an antenna.

The base station further comprises a selection unit and a control unit. The selection unit and the control unit may be implemented as single units or may be implemented for example as part of a standard control unit, like a CPU or a microcontroller.

In one embodiment, the base station may further comprise a determination unit being adapted to determine actual channel conditions of a radio transmission channel being used for the transmission between the base station and the user equipment, and being adapted to determine a maximum supported modulation order based on the determined actual channel conditions. The selection unit may be adapted to select the first modulation and coding scheme table or the second modulation and coding scheme table based on a comparison of the maximum supported modulation order with the first maximum modulation order and the second maximum modulation order.

The determination unit may be implemented as a single unit or may be implemented for example as part of a standard control unit, like a CPU or a microcontroller.

The user equipment (UE) may be any type of communication end device, which is capable of connecting with the described base station. The UE may be in particular a cellular mobile phone, a Personal Digital Assistant (PDA), a notebook computer, a printer and/or any other movable communication device.

The user equipment may comprise a receiving unit or receiver which is adapted for receiving signals from the base station. The user equipment may comprise a transmitting unit for transmitting signals. The transmitting unit may be a transmitter as known by a skilled person. The receiver and the transmitting unit may be implemented as one single unit, for example as a transceiver. The transceiver or the receiver and the transmitting unit may be adapted to communicate with the base station via an antenna.

The user equipment may further comprise a control unit for controlling and configuring the transmission based on information received from the base station being indicative for a selected MCS table. The control unit may be implemented as a single unit or may be implemented for example as part of a standard control unit, like a CPU or a microcontroller.

According to a third aspect of the invention, there is provided a cellular network system. The cellular network system comprises a base station as described above.

Generally herein, the method and embodiments of the method according to the first aspect may include performing one or more functions described with regard to the second or third aspect or an embodiment thereof. Vice versa, the base station or cellular network system and embodiments thereof according to the second and third aspect may include units or devices for performing one or more functions described with regard to the first aspect or an embodiment thereof.

According to a fourth aspect of the herein disclosed subject-matter, a computer program for controlling a modulation and coding scheme for a transmission between a base station and a user equipment is provided, the computer program being adapted for, when executed by a data processor assembly, controlling the method as set forth in the first aspect or an embodiment thereof.

As used herein, reference to a computer program is intended to be equivalent to a reference to a program element and/or a computer readable medium containing instructions for controlling a computer system to coordinate the performance of the above described method.

The computer program may be implemented as computer readable instruction code by use of any suitable programming language, such as, for example, JAVA, C++, and may be stored on a computer-readable medium (removable disk, volatile or non-volatile memory, embedded memory/processor, etc.). The instruction code is operable to program a computer or any other programmable device to carry out the intended functions. The computer program may be available from a network, such as the World Wide Web, from which it may be downloaded.

The herein disclosed subject matter may be realized by means of a computer program respectively software. However, the herein disclosed subject matter may also be realized by means of one or more specific electronic circuits respectively hardware. Furthermore, the herein disclosed subject matter may also be realized in a hybrid form, i.e. in a combination of software modules and hardware modules.

In the above there have been described and in the following there will be described exemplary embodiments of the subject matter disclosed herein with reference to a cellular network system, a base station and a method of controlling a modulation and coding scheme for a transmission between a base station and a user equipment. It has to be pointed out that of course any combination of features relating to different aspects of the herein disclosed subject matter is also possible. In particular, some embodiments have been described with reference to apparatus type embodiments whereas other embodiments have been described with reference to method type embodiments. However, a person skilled in the art will gather from the above and the following description that, unless otherwise notified, in addition to any combination of features belonging to one aspect also any combination between features relating to different aspects or embodiments, for example even between features of the apparatus type embodiments and features of the method type embodiments is considered to be disclosed with this application.

The aspects and embodiments defined above and further aspects and embodiments of the present invention are apparent from the examples to be described hereinafter and are explained with reference to the drawings, but to which the invention is not limited.

BRIEF DESCRIPTION OF THE DRAWING

It is noted that in different figures, similar or identical elements are provided with the same reference signs.

DETAILED DESCRIPTION

In the following, embodiments of the herein disclosed subject matter are illustrated with reference to the drawings and reference to aspects of current standards, such as LTE, and their further developments. However, such reference to current standards is only exemplary and should not be considered as limiting the scope of the claims.

Figure 1:
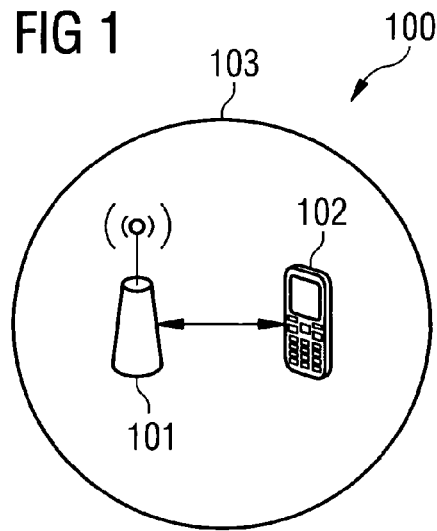
FIG. 1 shows a cellular network system according to an exemplary embodiment of the present invention.

FIG. 1 shows a cellular network system 100. A user equipment 102 is served by a first cell 103 of the cellular network system. The first cell is assigned to a base station 101.

The transmission and communication between the base station and the user equipment is controlled based on a modulation and coding scheme. The modulation and coding scheme is selectable based on a first modulation and coding scheme table comprising entries corresponding to a plurality of modulation and coding schemes with a first maximum modulation order or based on a second modulation and coding scheme table comprising entries corresponding to a plurality of modulation and coding schemes with a second maximum modulation order. In one embodiment, the second maximum modulation order is higher (for instance up to 256QAM) than the first maximum modulation order (for instance up to 64QAM).

The base station may determine actual channel conditions of the radio transmission channel being used for the transmission between the base station and the user equipment. Then, the base station may determine a maximum supported modulation order based on the determined actual channel conditions and eventually based on information from the user equipment which modulation order can be supported by the user equipment. The base station then selects the first modulation and coding scheme table or the second modulation and coding scheme table based on a comparison of the maximum supported modulation order with the first maximum modulation order and the second maximum modulation order. Thus, the modulation and coding scheme (MCS) for the transmission between the base station and the user equipment is controlled based on the selected modulation and coding scheme table.

The base station may also select the table based on any other information, for instance based on predefined selection criteria.

Figure 2:
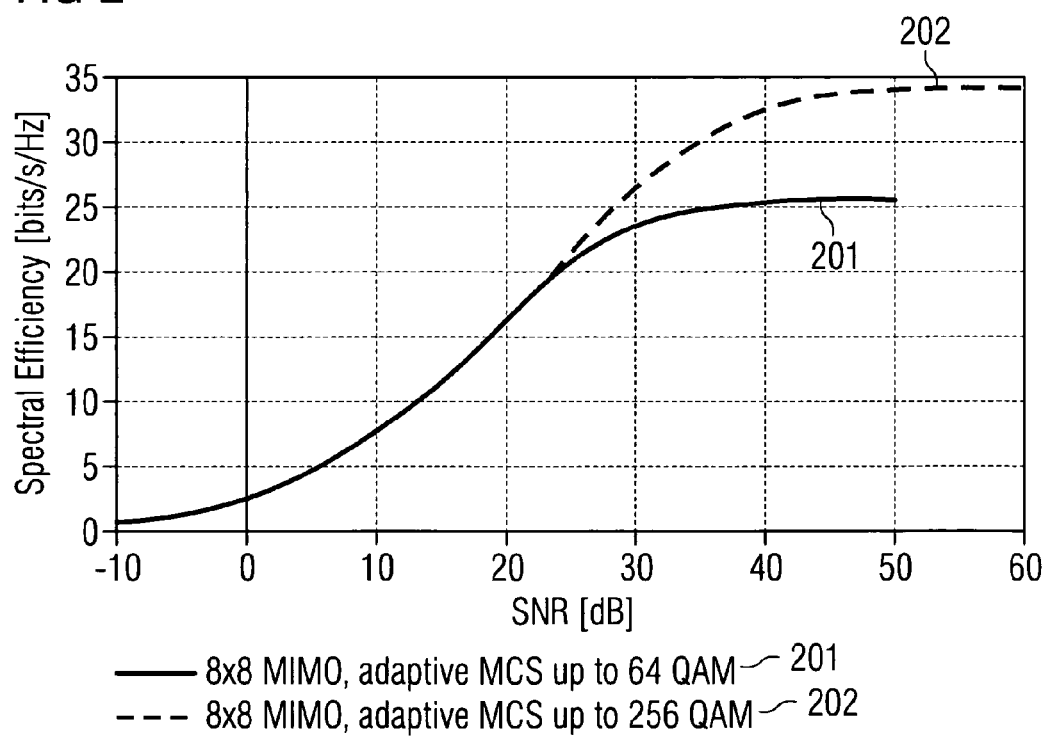
FIG. 2 shows a simulation of spectral efficiency for 64QAM and 256QAM.

In LTE (and LTE-Advanced), theoretical spectral efficiency is restricted by 64QAM modulation. FIG. 2 presents the simulated LTE-Advanced throughput with 8×8-MIMO and modulation restricted to 64QAM (reference number 201) (coding rate 8/9) in 1-tap Rayleigh channel with no spatial correlation. Spectral efficiency that would be gained with extension to 256QAM is also plotted to FIG. 2 for comparison (reference number 202). It can be seen that extension to 256QAM starts to have effect around 25 dB SNR range. In these figures the average SINR is plotted against the throughput. Even if the average is below the area whether 256QAM provides gain, due to fading the channel conditions may still be good for some time.

Figure 3:
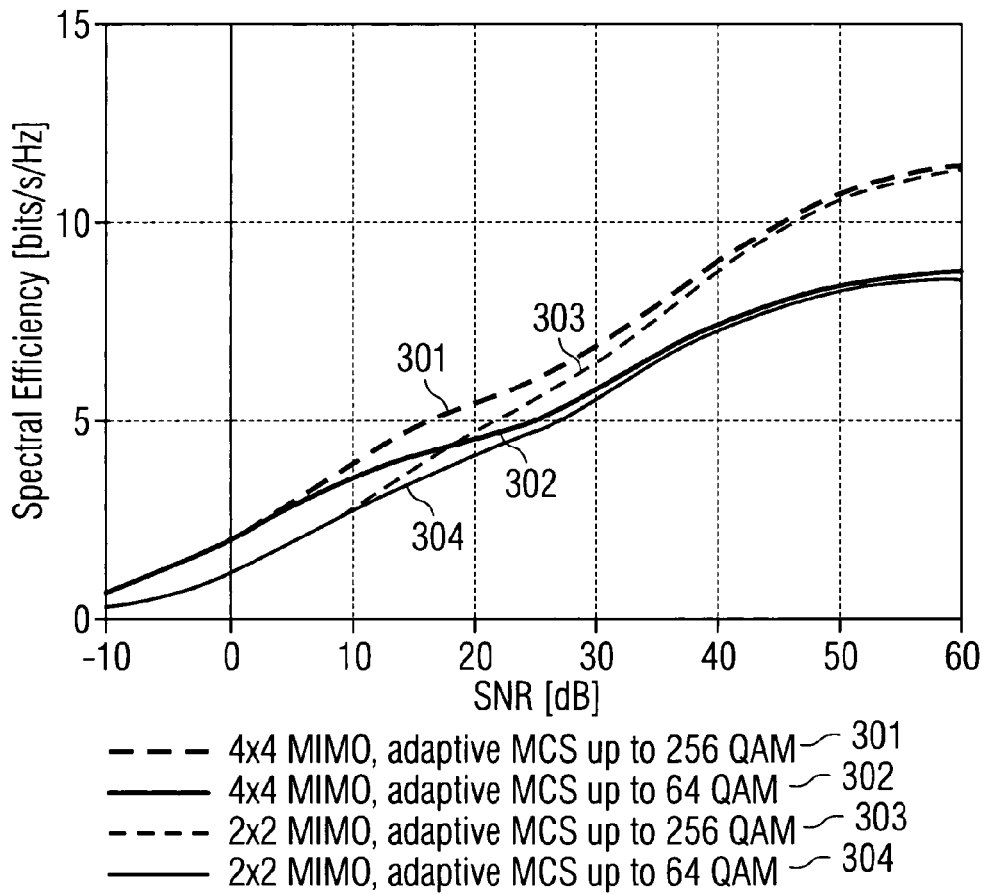
FIG. 3 shows a simulation of spectral efficiency for 4×4 MIMO and 2×2 MIMO, each for 64QAM and 256QAM.

Throughput in LTE is restricted by MCS also in a more practical scenario (for example in case of relay backhaul) where there is high spatial channel correlation that restricts the usage of large ranks. This is illustrated in the FIG. 3 where spectral efficiencies for 2×2 and 4×4 MIMO schemes with adaptive rank and MCS selections in high spatial correlation scenario are plotted as a function of average signal-to-noise ratio. For both 2×2 and 4×4 schemes two curves are presented, in one of which MCS is restricted to 64QAM (2×2: 304, 4×4: 302) and another one with MCS set extension to 256QAM (2×2: 303, 4×4: 301). It can be seen that extension to 256QAM increases the throughput already from around 10 dB SNR range in these scenarios. That means the throughput is already compromised well below the maximum throughput that is possible with 64QAM.

The problem is how to introduce 256QAM for LTE to maintain backward compatibility and avoid too much complexity. 256QAM addition might need to be done to both MCS index and modulation table and CQI table defined in LTE standard.

In Release 10, a new DCI format 2c was added in order to support close loop MIMO with up to 8 layers. One straightforward solution would be to define new DCI format for 256QAM (and use more than 5 bits for the modulation and coding scheme field in the DCI). This is no desirable solution because it doubles the number of DCI formats resulting in a significant complexity increment. In UMTS there was also an extension form 16 QAM to 64 QAM by adding one extra signalling bit [R1-070635 R1-070570]. The extra bit can either be provided by defining an new DCI format at the expense of worse decoding performance and more blind decodings or at lest more optional DCI sizes. Or the bit is "stolen" from some other signaling, limiting the possibilities there, e.g. in HSDPA the bit is stolen from the code allocation table which only supports half as many entries if 64QAM is enabled.

Another possible solution would be to take the existing MCS/CQI index table as a basis and change the usage of it so that only a subset of the current MCS values would be used, e.g. drop every third to make room for the additional 256QAM values. This causes a coarser adaptation of the channel conditions and is therefore undesirable. In the following, this method is called sub-sampling.

The idea of the herein described method is to define a new procedure which allows to use 256QAM in good channel conditions using the existing DCI formats. For this purpose, additional new MCS and CQI index tables with extension to 256QAM ($Q_m=8$) may be generated. The new tables have the same size as the usual ones. Decision whether original index table or the table with 256QAM extension is used is either determined by the base station (or eNB) and the switching is indicated to the UE with a signalling message or decided in implicit way.

In one embodiment, there is a common index area common for both the original table and the table with 256QAM extension where MCS/CQI index, modulation order and TBS index are identical and are also in identical positions in both tables. Only this common MCS index area might be used while switching the tables to avoid ambiguities.

In one embodiment, the MCS/CQI index table with 256QAM extension is formed so that room for the TB (transport block) sizes related to 256QAM is taken from originally low TB sizes. Furthermore, there may be a few common modulation/TB sizes in the common MCS index area from the low range of the modulation set for such situations where extended 256QAM table is in use and channel conditions drop quickly. These indexes can be sub-sampled from the low TBS area.

A two step switching procedure may be provided for CQI index table switching in order to make sure the UE is aware of the switching and does not use ambiguous table entries during switching. The MCS table may already be switched to the 256QAM version.

There could be also a few common modulation/TB sizes in the common MCS index area from the high range of the modulation set for such situations where 256QAM should be used quickly e.g. during initial call setup before an explicit selection takes place or in order to allow quick reaction towards better qualities.

The herein described second tables for the MCS and CQI index tables may be generated corresponding to 36.213 table 7.1.7-1 but with extension to 256QAM ($Q_m=8$). One option is that the original table 7.1.7-1 and table with 256QAM extension are switched by eNB with an RRC-message (alternatively also MAC/or control signalling messages could be considered). In this case, algorithm responsible of this switching is eNB vendor specific but will obviously take CQI reports from the UE into account. The UE may be responsible of switching the MCS index table according to the RRC message and sending an acknowledgement to eNB about the received RRC message (the acknowledgement may not be essential, it may help however to avoid backward compatibility issues as a UE not supporting the switching will not acknowledge the command).

Since it takes about 100-200 ms for a RRC message to take effect in the UE (processing delays of higher layers haven't been standardized and depend on how often they have to be retransmitted in case of detection errors) and because (1) RRC messages can get lost and (2) there is uncertainty related to the starting time when the new configuration is taken into use by the UE, there may need to be a MCS index area common for both tables, which allows data scheduling also during the time of uncertainty. This may ensure that an MCS from that area is understood correctly no matter whether the switching already took place or not. This common area may be continuous, i.e. has continuous MCS entries to allow a fine adaptation during switching as well. MCS index, modulation order and TBS index may be identical in both MCS index tables on this area. For instance, only this common MCS index area can be used during the RRC procedure switching the tables and before eNB has received an acknowledgement from UE that it has received the RRC message switching the MCS index table. The common index area may be used also if implicit table switching is used and, in this case, only the common area can be used during the implicit switching procedure.

Additionally, there may be a few common low modulation/TB sizes in the common MCS index area for such situations where extended 256QAM table is in use and channel conditions drop quickly. TB sizes that are required to transmit the switching command may be available in the common MCS index area.

New TB sizes may be introduced in the MCS/CQI index table with 256QAM extension in order to increase spectral efficiency with 256QAM:

Room for these new TB sizes can be taken from current low TB sizes (QPSK and possibly low 16QAM)

The reserved TBS size for QAM may also be in the low modulation common MCS area. This MCS is used for retransmissions with bad channel conditions, in particular if the previous initial transmission was done with a higher MCS, in particular a higher Modulation Order, or with a different number of assigned resources. However, it might not be necessary to also have the reserved entry for 256QAM included.

There can be also some 256QAM entries in the common area for situations like call setup where 256QAM would be useful to be utilized quickly (with a cost of losing the backwards compatibility and having less entries available in the "ordinary" range). Such a default "compromise" MCS table, where sub-sampling is used to achieve a higher dynamic range can be used as soon as the eNB is aware of the capabilities of the UE. A switch from the legacy table, i.e., with lower maximum modulation order, to that compromise table, i.e., with higher maximum modulation order, could be done implicitly as part of the capability enquiry procedure which also makes the capability available to the eNB. Subsequently, an explicit switching to a table focusing on low or high MCS may be done, but also an explicit switching to such a sub-sampled table in case the channel conditions vary so quickly that it is not feasible to do explicit switching.

An example of the MCS index and modulation table with 256QAM extension is shown in Table 1. The MCS indexes 12 to 31 refer to the continuous common MCS index area. The MCS indexes 0, 5 and 10 refer to a sub-sampled low modulation common MCS index area and the MCS indexes 1 to 4, 6 to 9 and 1 refer to the 256QAM extension.

TABLE 1

Example for a MCS index table

| MCS Index $I_{MCS}$ | Modulation Order $Q_m$ | TBS Index $I_{TBS}$ |
|---|---|---|
| 0 | 2 | 0 |
| 1 | 8 | 26 |
| 2 | 8 | 27 |
| 3 | 8 | 28 |
| 4 | 8 | 29 |
| 5 | 2 | 5 |
| 6 | 8 | 30 |
| 7 | 8 | 31 |
| 8 | 8 | 32 |
| 9 | 8 | 33 |
| 10 | 4 | 9 |
| 11 | 8 | reserved |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | |
| 31 | 6 | |

Similarly to the MCS index table, a new CQI index table with 256QAM extension and with common index area be used. The CQI tables are switched with the same RRC message responsible for MCS index table switching. In another case, the CQI tables may be switched implicitly. The eNB may be responsible of handling possible error situations caused by the unawareness which table the UE is using at an exact time during this RRC procedure. The eNB can for example simply ignore non-common CQI indexes, round them to the closest common index or take a risk and decide to which table they most probably are related to, based on some heuristics. Such error cases can happen because contrary to MCS selection, where the eNB initiates the change and can therefore avoid ambiguous entries during switching, for CQI the UE isn't aware of the imminent switching and thus cannot avoid them (unless it avoids them always which is pointless). In order to increase the likelihood that the eNB can pick the right decision in case of ambiguous table entries, the minimum differences in TBS for any MCS index should be maximized. This is the case in Table 1, because the entries are arranged in increasing TBS for both the 256 and QAM cases. If the 256 QAM cases were ordered inversely, for MCS index 9 there would be a TBS of 26 (in case of 256QAM) or 8 (in case of QPSK) i.e. a difference of 26−8=18, while in Table 1 the difference is 33−8=25. The higher the difference the less likely the eNB cannot use heuristics (e.g. if the channel really changed by that amount of 25 steps). For the same reason it may be beneficial to place the reserved 256QAM entry at the highest MCS index, i.e., for MCS index 11 in Table 1. The reserved entry is only relevant for downlink, not for uplink. Therefore, in the uplink table it can be easily dropped and replaced by the normal entry for QAM (in Table 1 with TBS 10).

In order to avoid ambiguous CQI reports during the switching time, a two step switching procedure can be employed: in a first command the eNB announces the switching. From then on the UE only uses CQI reports from the common MCS area. In a second command the eNB commands to perform the switching. From then on the UE fully uses the high MCS table. Despite the fact that there are now two ambiguous periods, there is no risk for misinterpretations: During both ambiguous periods the UE uses either a well defined MCS table (the original one during the first ambiguous period and the final one during the second one) or only MCSs from the common MCS area and in this common area there is no risk of misunderstanding. This is due to the fact that the entries from the common MCS area may be coded identically in both tables. This will make the order of the entries in the high MCS area non-consecutive but this is a minor complexity and can be solved e.g. by implementing a lookup-table.

The message flow according to this embodiment can then be like this:
1) From eNB to UE: RRC message to switch MCS table and restrict CQI reporting to the common index area. The eNB only uses common index area for MCS
2) From UE to eNB: confirmation (and implicitly message), the eNB can now use the complete index area of the new MCS table, the eNB knows that the UE will use new CQI table (initially only the common index area).
3) From eNB to UE: confirmation, the UE can now use the full index area of the new CQI table.

Despite there are actually two handshakes, it might not take 4 messages but only 2 because the middle message may have a double meaning on both CQI and MCS tables.

Another approach to avoid ambiguous CQI reports is to allow the UE to initiate the switching of tables for CQI and the eNB to initiate switching for MCS. Then always the originator of a message switches to corresponding tables and can thus restrict usage to the common index area during the ambiguous period.

A new UE category is needed with 256QAM included in order to indicate UE's capability to support 256QAM. In case the UE does not support 256QAM, the above mentioned process and MCS/CQI index tables with 256QAM extensions are not used. Alternatively the eNB can transmit the switching command, and determine form the response, whether the UE supports 256QAM. In the initial access phase, 256QAM and thus the MCS table of the higher modulation order should not be used since the eNB does not yet know the UEs capabilities.

The process presented above can be used for extensions to even higher MCSs. Also the process can be extended to cover more than two tables to switch between. Common MCSs that are represented in two or more tables should always be at identical positions. There can be differences in the size and forming of the common index areas between the tables, for example it can be possible to have different level sub-samplings in different tables. For example, there may be 3 tables, low, mid and high. Then the mid table can include every second MCS entry in the low modulation area, while the high table only uses every 4th entry there (similar to Table 1), and these entries are selected from the ones which are also present in the mid table. This is possible because 2 is a divider of 4, therefore the sub sampling of the high table should not select every $3^{rd}$ or $5^{th}$ entry which would not be compatible. This may also be used for Table 1 that covers a broader range of CQI values.

There are numerous advantages in the proposed solution. The existing DCI format design is unchanged. This allows to support 256 QAM for each DL DCI formats while maintaining the existing DCI blind decoding burden at the UE. The proposed scheme provides easy means for the eNB to avoid complicated error cases due to signaling errors. The proposed design allows to keep the basic functionality of the existing DL resource allocation (CQI/MCS index table) unchanged. Hence, it has only minimal impact to the DL scheduler operation.

Figure 4:
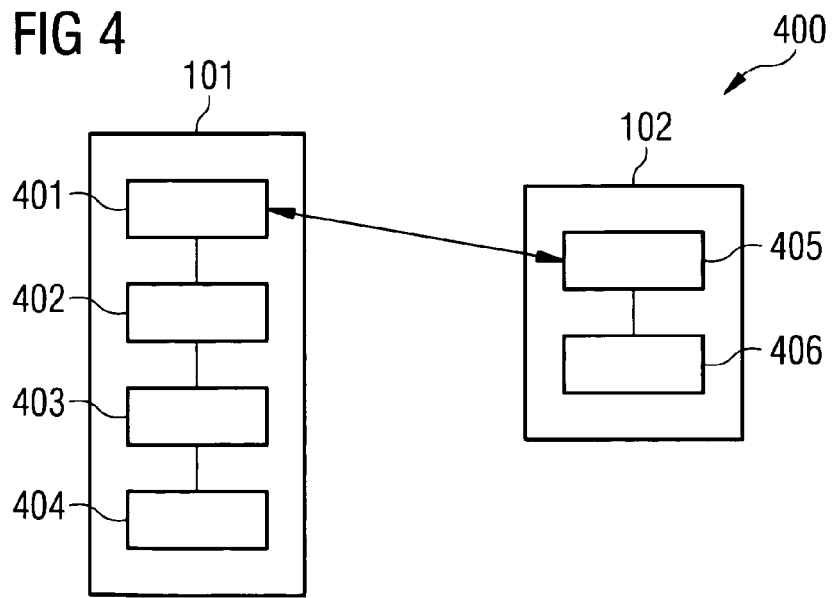
FIG. 4 shows a base station and a user equipment within a cellular network system according to an exemplary embodiment of the invention.

FIG. 4 shows a cellular network system 400 according to an exemplary embodiment of the invention. The cellular network system comprises a base station 101 and a user equipment 102 being served by the base station.

In the following, the base station is described with a determination unit. However, it should be noted that the determination unit is optional.

The base station comprises a determination unit 402 being adapted to determine actual channel conditions of a radio transmission channel being used for the transmission between the base station 101 and the user equipment 102, and being adapted to determine a maximum supported modulation order based on the determined actual channel conditions. The base station further comprises a selection unit 403 being adapted to select the first modulation and coding scheme table or the second modulation and coding scheme table based on any predefined criterion or on a comparison of the maximum supported modulation order with the first maximum modulation order and the second maximum modulation order. Moreover, the base station comprises a control unit 404 being adapted to control the modulation and coding scheme for the transmission between the base station and the user equipment based on the selected modulation and coding scheme table.

The base station may be any type of access point or point of attachment, which is capable of providing a wireless access to a cellular network system. Thereby, the wireless access may be provided for the user equipment, or for any other network element, which is capable of communicating in a wireless manner. The base station may be a NodeB, eNB, home NodeB or HeNB, or any other kind of access point.

The base station may comprise a receiving unit, for example a receiver as known by a skilled person. The base station may also comprise a transmitting or sending unit, for example a transmitter. The receiver and the transmitter may be implemented as one single unit, for example as a transceiver 401. The transceiver or the receiving unit and the sending unit may be adapted to communicate with the user equipment via an antenna.

The determination unit 402, the selection unit 403 and the control unit 404 may be implemented as single units or may be implemented for example as part of a standard control unit, like a CPU or a microcontroller.

The user equipment (UE) may be any type of communication end device, which is capable of connecting with the described base station. The UE may be in particular a cellular mobile phone, a Personal Digital Assistant (PDA), a notebook computer, a printer and/or any other movable communication device.

The user equipment may comprise a receiving unit or receiver which is adapted for receiving signals from the base station. The user equipment may comprise a transmitting unit for transmitting signals. The transmitting unit may be a transmitter as known by a skilled person. The receiver and the transmitting unit may be implemented as one single unit, for example as a transceiver 405. The transceiver or the receiver and the transmitting unit may be adapted to communicate with the base station via an antenna.

The user equipment may further comprise a control unit 406 for controlling and configuring the transmission based on information received from the base station being indicative for a selected MCS table. The control unit may be implemented as a single unit or may be implemented for example as part of a standard control unit, like a CPU or a microcontroller.

Having regard to the subject matter disclosed herein, it should be mentioned that, although some embodiments refer to a "base station", "eNB", etc., it should be understood that each of these references is considered to implicitly disclose a respective reference to the general term "network component" or, in still other embodiments, to the term "network access node". Also other terms which relate to specific standards or specific communication techniques are considered to implicitly disclose the respective general term with the desired functionality.

It should further be noted that a base station as disclosed herein is not limited to dedicated entities as described in some embodiments. Rather, the herein disclosed subject matter may be implemented in various ways in various locations in the communication network while still providing the desired functionality.

According to embodiments of the invention, any suitable entity (e.g. components, units and devices) disclosed herein, e.g. the determination unit, are at least in part provided in the form of respective computer programs which enable a processor device to provide the functionality of the respective entities as disclosed herein. According to other embodiments, any suitable entity disclosed herein may be provided in hardware. According to other—hybrid—embodiments, some entities may be provided in software while other entities are provided in hardware.

It should be noted that any entity disclosed herein (e.g. components, units and devices) are not limited to a dedicated entity as described in some embodiments. Rather, the herein disclosed subject matter may be implemented in various ways and with various granularities on device level while still providing the desired functionality. Further, it should be noted that according to embodiments a separate entity (e.g. a software module, a hardware module or a hybrid module) may be provided for each of the functions disclosed herein. According to other embodiments, an entity (e.g. a software module, a hardware module or a hybrid module (combined software/hardware module)) is configured for providing two or more functions as disclosed herein.

It should be noted that the term "comprising" does not exclude other elements or steps. It may also be possible in further refinements of the invention to combine features from different embodiments described herein above. It should also be noted that reference signs in the claims should not be construed as limiting the scope of the claims.

LIST OF REFERENCE SIGNS

100 Cellular network system
101 Base station
102 User equipment
103 Cell
201 8×8 MIMO for 64QAM
202 8×8 MIMO for 256QAM
301 4×4 MIMO for 256QAM
302 4×4 MIMO for 64QAM
303 2×2 MIMO for 256QAM
304 2×2 MIMO for 64QAM
400 Cellular network system
401 Transceiver of the base station 402 Determination unit of the base station
403 Selection unit of the base station
404 Control unit of the base station
405 Transceiver of the user equipment
406 Control unit of the user equipment

The invention claimed is:

1. A method comprising:
controlling a modulation and coding scheme for a transmission between a base station and a user equipment, wherein the modulation and coding scheme is selectable based on a first modulation and coding scheme table comprising entries corresponding to a plurality of modulation and coding schemes with a first maximum modulation order or based on a second modulation and coding scheme table comprising entries corresponding to a plurality of modulation and coding schemes with a second maximum modulation order, the method comprising
selecting, by the base station, the first modulation and coding scheme table or the second modulation and coding scheme table, both tables having a common index area that is positioned in both tables in an identical position; and
controlling, by the base station, the modulation and coding scheme for the transmission between the base station and the user equipment based on the selected modulation and coding scheme table, wherein the second maximum modulation order is higher than the first maximum modulation order, in particular wherein the first maximum modulation order corresponds to 64QAM and the second modulation order corresponds to 256QAM.

2. The method as set forth in claim 1, wherein bits representing a modulation and coding scheme index are the same for the first modulation and coding scheme table and for the second modulation and coding scheme table.

3. The method as set forth in claim 1, the method further comprising
determining, by the base station, actual channel conditions of a radio transmission channel being used for the transmission between the base station and the user equipment,
determining, by the base station, a maximum supported modulation order based on the determined actual channel conditions, and
selecting, by the base station, the first modulation and coding scheme table or the second modulation and coding scheme table based on a comparison of the maximum supported modulation order with the first maximum modulation order and the second maximum modulation order.

4. The method as set forth in claim 1, the method further comprising
transmitting information to the user equipment being indicative for the selected modulation and coding scheme table.

5. The method as set forth in claim 4, wherein transmitting information to the user equipment is based on radio resource control signalling.

6. The method as set forth in claim 4, wherein transmitting information to the user equipment is based on implicit signalling.

7. The method as set forth in claim 3, the method further comprising
receiving a confirmation information from the user equipment being indicative for a performed change of the selected modulation and coding scheme table.

8. The method as set forth in claim 7, wherein the first modulation and coding scheme table and the second modulation and coding scheme table each comprise a common subset of equal entries being arranged at same positions within the first modulation and coding scheme table and the second modulation and coding scheme table,
in particular wherein the method further comprises,
after transmitting the information to the user equipment being indicative for the selected modulation and coding scheme table and before receiving the confirmation information from the user equipment, controlling the modulation and coding scheme for the transmission between the base station and the user equipment based on the selected modulation and coding scheme table based on the common subset of entries.

9. The method as set forth in claim 1, wherein controlling an initial transmission between the base station and the user equipment is based on the first modulation and coding scheme table.

10. The method as set forth in claim 1, wherein the actual channel conditions are determined based on a channel quality indicator being selectable based on a first channel quality indicator table supporting the first maximum modulation order or based on a second channel quality indicator table supporting the second maximum modulation order, the method comprising
receiving, by the base station, a channel quality indicator from the user equipment, and
determining, by the base station, the actual channel conditions of the radio transmission channel being used for the transmission between the base station and the user equipment based on the received channel quality indicator.

11. The method as set forth in claim 10, the method further comprising
selecting, by the base station, the first channel quality indicator table or the second channel quality indicator table based on the selected modulation and coding scheme table, and
transmitting information to the user equipment being indicative for the selected channel quality indicator table.

12. The method as set forth in claim 10, wherein the first channel quality indicator table and the second channel quality indicator table each comprise a common subset of equal entries being arranged at same positions within the first channel quality indicator table and the second channel quality indicator table.

13. A base station comprising:
at least one processor; and
at least one memory including computer program code, where the at least one memory and the computer program code are configured, with the at least one processor, to cause the base station to at least:
control a modulation and coding scheme for a transmission between the base station and a user equipment, wherein the modulation and coding scheme is selectable based on a first modulation and coding scheme table comprising entries corresponding to a plurality of modulation and coding schemes with a first maximum modulation order or based on a second modulation and coding scheme table comprising entries corresponding to a plurality of modulation and coding schemes with a second maximum modulation order, comprising:
selecting the first modulation and coding scheme table or the second modulation and coding scheme table, both tables having a common index area that is positioned in both tables in an identical position; and controlling the modulation and coding scheme for the transmission between the base station and the user equipment based on the selected modulation and coding scheme table, wherein the second maximum modulation order is higher than the first maximum modulation order, in particular wherein the first maximum modulation order corresponds to 64QAM and the second modulation order corresponds to 256QAM.

14. A cellular network system, the cellular network system comprising a base station as set forth in claim 13.

15. A user equipment comprising:
    at least one processor; and
    at least one memory including computer program code, where the at least one memory and the computer program code are configured, with the at least one processor, to cause the user equipment to at least:
control a coding scheme for a transmission between a base station and the user equipment, comprising:

receiving, from the base station, information being indicative of a selected modulation and coding scheme, wherein the selected modulation and coding scheme is based on a first modulation and coding scheme table or a second modulation and coding scheme table, both tables having a common index area that is positioned in both tables in an identical position; and controlling and configuring a transmission based on the received information, wherein the received information comprises entries corresponding to a plurality of modulation and coding schemes with a first maximum modulation order or based on a second modulation, and wherein the second maximum modulation order is higher than the first maximum modulation order, in particular wherein the first maximum modulation order corresponds to 64QAM and the second modulation order corresponds to 256QAM.

16. The method as set forth in claim 11, wherein the modulation and coding scheme is selected as a function of average signal-to-noise ratio.

* * * * *